April 23, 1963　　　S. F. KAPFF　　　3,086,386
VISCOSITY MEASURING SYSTEM
Filed Sept. 29, 1959　　　　　　　　2 Sheets-Sheet 1

INVENTOR.
Sixt Frederick Kapff
BY
ATTORNEY

April 23, 1963 S. F. KAPFF 3,086,386
VISCOSITY MEASURING SYSTEM

Filed Sept. 29, 1959 2 Sheets-Sheet 2

*INVENTOR.*
*Sixt Frederick Kapff*
BY
*ATTORNEY*

United States Patent Office 3,086,386
Patented Apr. 23, 1963

3,086,386
VISCOSITY MEASURING SYSTEM
Sixt Frederick Kapff, Homewood, Ill., assignor to Standard Oil Company, Chicago, Ill., a corporation of Indiana
Filed Sept. 29, 1959, Ser. No. 843,288
1 Claim. (Cl. 73—23)

This invention relates to method and means for the qualitative and quantitative analysis of fluids by measuring the viscosities thereof. More particularly, the invention relates to a system for determining fluid viscosities as a measure of the composition or the purity of a fluid.

In many chemical laboratory and plant processing operations it is necessary to obtain rapid qualitative and quantitative analyses of gases or gaseous mixtures. An illustrative application of this type is in the catalytic hydroforming of petroleum naphthas, where monitoring the composition of recycle gas for hydrogen content is necessary for process control and in making material balances. Another application occurs in the storage of liquified propane or butane, where a knowledge of the air content of hydrocarbons in the vapor space is desirable. Of necessity, plant analytical equipment must be rugged and foolproof, and must provide a rapid indication of stream composition.

A primary object of the present invention is to provide a system for making qualitative or quantitative analyses of gases, which system is rapid, rugged, and capable of trouble-free and foolproof operation. Another object is to provide method and means for analyzing gas mixtures which may be embodied in a portable device, requiring no thermostating bath as is conventionally employed. Yet another object is to provide an analytical device which has an output that is linear with composition changes. Still a further object is to provide a system for determining the viscosity of a gaseous stream. Other and more particular objects will become apparent as the description of this invention proceeds in detail.

Briefly, the present invention analyzes gases by measuring the viscosity of such gases. The invention is predicated on the fact that gases may be qualitatively or quantitatively analyzed by relating the viscosity of the gas to its composition. My system employs two flow paths, in one of which is placed a flow resistance or restriction which is insensitive to the viscosity of a flowing gas, while in the other the gas flows through a restriction which has a pressure drop dependent on the viscosity of the flowing gas. Basically, the present invention depends on the fact that the rate of flow of gas through some types of flow restrictive elements changes with a change in viscosity of the gas, while the flow through other types of restrictions is not so effected. An orifice plate is a typical viscosity-insensitive resistance, while a capillary tube, having a small diameter but a relatively long flow path, or a venturi, represent types of viscosity-sensitive resistances.

Thus, in accordance with the invention, changes in relative rates of flow through the two flow paths are measured, and these changes are then related to the viscosity of the gaseous mixture or may be expressed directly in terms of composition of flowing gas.

In the preferred embodiment of my invention, I employ a pneumatic bridge system. Such systems are well known to the art, and in effect are analogies of the electrical Wheatstone bridge. One outlet arm contains say an orifice plate, while the other has a capillary restriction. The two inlet arms may contain restrictions of the orifice type but, for doubling the sensitivity of the bridge, the inlet arm adjacent the outlet orifice has a capillary restriction while the inlet arm adjacent the outlet capillary restriction has an orifice restriction therein.

Since the zero of a pneumatic bridge ordinarily depends strongly on temperature, changing roughly three inches of water for a 10° C. change in temperature, suitable temperature compensation or thermostating may be employed to eliminate this defect. When employing a pneumatic bridge, means are provided for determining bridge imbalance as a measure of the viscosity, or composition, of the flow gas. Several alternative detectors are available. For example, a pressure gage such as a vertical or inclined manometer may be connected in a conduit communicating with each intersection of inlet and outlet arms of the bridge. Alternatively, inequalities in the flow through each parallel path may be indicated by flow responsive detectors such as hot wire anemometers or electrically heated thermistors. Any of the aforementioned imbalanced detectors may read directly or may be employed as a null balance instrument by manually or automatically varying the resistance of one bridge arm to restore a null balance across the bridge.

A particular advantage of the instant invention is that it may be assembled in a portable embodiment. Heretofore, gas analysis devices relying upon physical methods of analysis have required accurate temperature control. This generally has necessitated the use of large and carefully thermostated temperature controlled baths. However, in one aspect of the invention integral temperature compensation may be supplied by including an additional resistance in one of the bridge arms, which resistance varies in response to stream or ambient temperature. Thus the resultant viscosity or composition, as determined by the described indicators, is made independent of ambient temperature. Accordingly, the present device may be made in a portable form.

The invention will be more fully described, and advantages thereof indicated in more detail, in the ensuing description when read in conjunction with the attached drawings wherein:

FIGURE 1a schematically shows one form of the invention utilizing a pneumatic bridge system;

Figure 6:
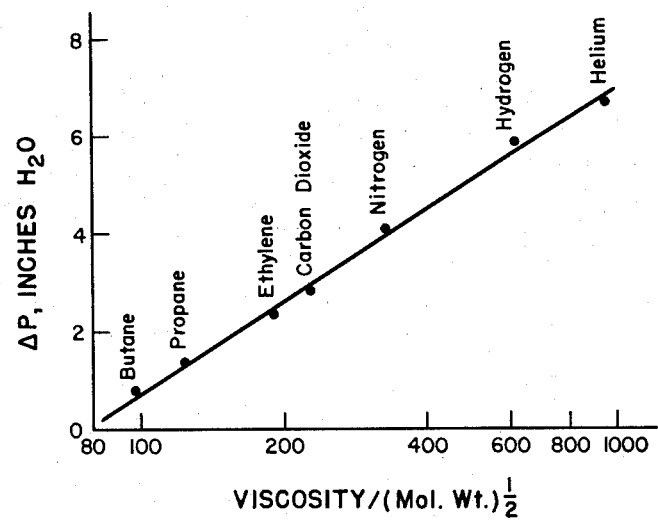
Figure 7:
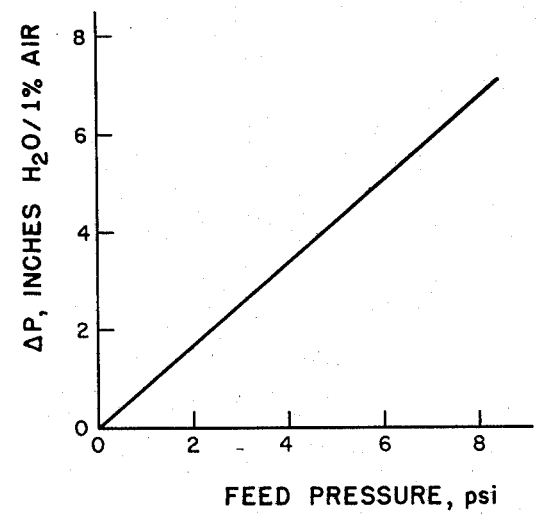

FIGURE 6 plots the bridge pressure drop as a function of the viscosity divided by the square root of molecular weight of a series of pure gases; and FIGURE 7 illustrates the dependency of bridge sensitivity on upstream feed pressure.

Figure 1A:
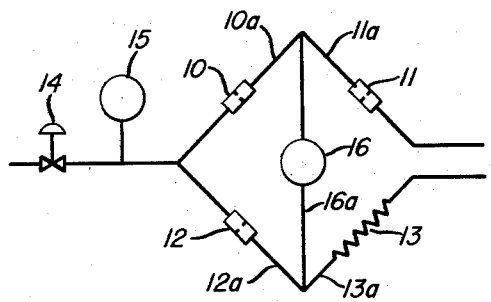
FIGURE 1b is another form of the invention having doubled sensitivity.

Turning first to FIGURE 1a, a typical pneumatic bridge comprises four conduits, i.e. inlet conduits 10a and 12a, and outlet conduits 11a and 13a. In outlet conduit 11a, an orifice plate, having say an inner diameter of .008″ and a thickness of about .005″ is disposed, while in conduit 13a a capillary tube of say 0.031″ I.D. and about 8 feet long is located. The pressure drop across orifice resistance 11 is independent of the gas viscosity, while the pressure drop across capillary 13, and hence the flow of gas through capillary 13, is a function of viscosity.

Inlet arms 10a and 12a are equipped with orifice restrictions 10 and 12 respectively, each having a hole diameter of approximately .008". Upstream of the bridge there is connected a constant pressure control valve 14 and a suitable pressure gage 15 for indicating inlet pressure.

Detector 16 is connected across the arms of the bridge, and is adapted to indicate bridge imbalance caused by the effect of gas viscosity on flow rate through capillary 13. As indicated previously, detector 16 is sensitive to bridge imbalance, and may operate either to measure pressure differences across the bridge upstream of the orifice 11 and capillary 13, it may measure the flow or relative rates of flow in conduits 11a or 13a, or it may be a flow indicating device to measure flow through a conduit 16a caused by pressure inequalities upstream of orifice 11 and capillary 13.

In the preferred form, detector 16 is a horizontal manometer having a horizontally disposed capillary tube containing a droplet of oil or other liquid. When the droplet is motionless, this is a very sensitive indication of a null balance across the bridge.

Figure 1B:
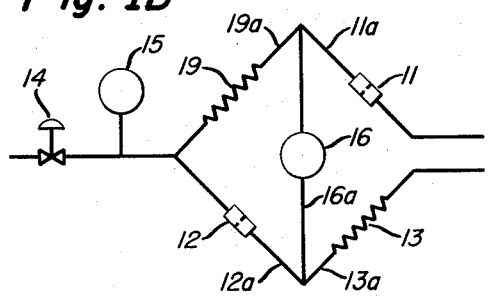

In FIGURE 1b an alternate form of the pneumatic bridge is shown wherein sensitivity to viscosity changes is doubled. This effect is achieved by depositing a second capillary resistance, in lieu of an orifice resistance, in an inlet arm upstream of arm 11a which contains orifice 11. Arm 12a, which is the inlet to outlet arm 13a, contains an orifice 12. By this use of two capillaries, 13 and 19, on opposite sides of the bridge, each unit of viscosity produces twice the bridge imbalance as is obtainable with a single capillary according to FIGURE 1a.

When a null balance technique is employed, it is necessary to increase or decrease the resistance of outlet arm 11 of FIGURE 1 by a manually or automatically controlled variable resistance in that arm. The change in variable resistance necessary to restore the null balance is thus a measure of the original bridge imbalance and hence a measure of the gas viscosity and composition.

Figure 2:
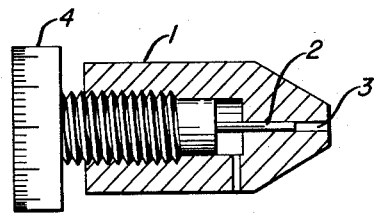
FIGURE 2 is a needle valve which, according to one embodiment of the invention, may be connected in an outlet arm of a bridge when employing the null balancing technique.

FIGURE 2 shows a needle valve suitable for use as a variable restriction. The valve comprises a body 1, a needle 2 in bore 3, and a threaded handle 4 connecting to needle 2. Handle 4 is provided with suitable graduations as shown whereby the number and fraction of turns necessary to restore pressure equilibrium (i.e. the null balance) in a pneumatic bridge may be observed. The number of turns is thus related to the viscosity of a gas undergoing test.

Figure 3:
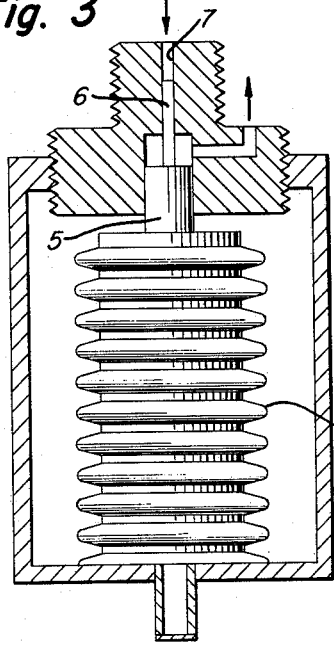
FIGURE 3 is a temperature-compensating resistance.

In FIGURE 3, a temperature-sensitive resistance is shown which is capable of eliminating the need for thermostatically controlled baths. The device comprises a flexible bellows 21 containing a quantity of temperature expansive material such as toluene and which is at the same temperature as that of the gas under test. The volume of liquid in bellows 21 is selected to move the needle valve 6 the correct amount for perfect compensation; this is easily accomplished by trial and error. Bellows 21 is connected via guide 5 to needle valve comprising needle 6 and bore 7. Accordingly, expansion of liquid toluene in bellows 21 due to an increasing ambient temperature tends to close off the needle valve and hence increase the resistance of this valve. The temperature compensator of FIGURE 3 is installed in outlet arm 11 of the pneumatic bridge.

Figure 4:
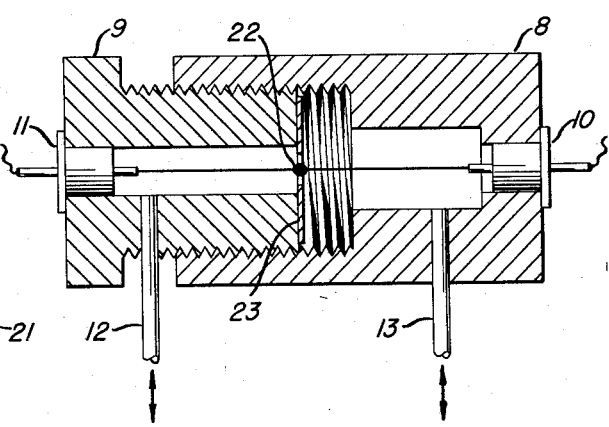
FIGURE 4 shows one form of flowmeter which may be used in measuring bridge imbalance by detecting the rate of flow across the bridge.

Turning now to FIGURE 4, an anemometer type flowmeter employing thermistor bead 22 is shown. This flowmeter is suitable for installation as detector 16 (FIGURE 1a or 1b) and measures the absolute amount of gas flowing through conduit 16a as a result of pressure imbalance in the bridge system. Thermistor bead 22 is disposed in a housing comprising body 8 and threaded plug 9, and is supported by insulating plugs 10 and 11. An orifice of, say, 0.008" I.D. surrounds thermistor 22 and thereby increases flow rate across the thermistor bead. Thermistor 22 of 500K resistance is placed in a conventional Wheatstone bridge circuit and is heated by the application of an electric current, e.g. 600 microamps.

Since thermistor 22 has a substantial, negative, temperature coefficient of resistance, any change in the temperature of thermistor 22 induced by increased conductivity from a higher flow rate of gases is reflected as a change in its resistance. The Wheatstone bridge including thermistor bead 22 is then employed to indicate the viscosity or composition of the sample gas.

A viscosity measuring device was constructed according to the principles set forth herein and tested with several pure gases. Bridge imbalance, expressed as pressure differences in inches of water, for a series of gases were determined, and the result expressed in FIGURE 5. Viscosities for several pure gases taken from the literature, in units of poises $\times 10^7$, are listed below, and afford a means for the qualitative identification of pure gases:

| Gas: | Viscosity at 20° C. $\times 10^7$, poises $\times 10^7$ |
| --- | --- |
| Neon | 3111 |
| Argon | 2217 |
| Oxygen | 1985 |
| Helium | 1941 |
| Nitrogen | 1728 |
| Carbon dioxide | 1493 |
| Methane | 1087 |
| Ethylene | 1008 |
| Ethane | 909 |
| Hydrogen | 876 |
| Propylene | 835 |
| Propane | 801 |
| Isobutane | 744 |
| n-Butane | 739 |

Figure 5:
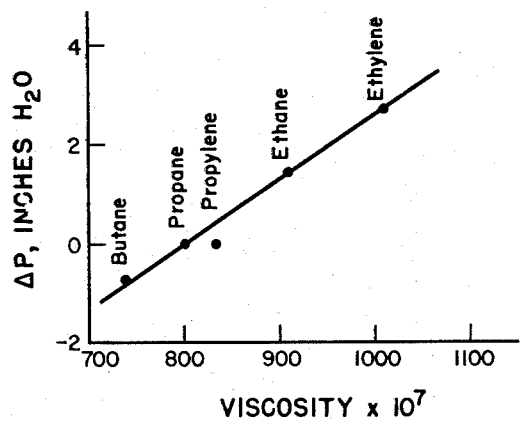
FIGURE 5 illustrates the results of measuring the viscosity of several pure gases with a hydraulic bridge viscosimeter.

It will be observed from FIGURE 5 that bridge imbalance has approximately a linear correlation with viscosity of the gas. Actually, this linear relationship holds true for chemically similar gases, and a more complex dependency, wherein the logarithm of viscosity divided by square root of molecular weight, includes monatomic, diatomic, and higher polyatomic gases. This latter relationship is indicated in FIGURE 6, and it is seen that such diverse gases as helium, carbon dioxide, and butane all follow along the same correlation line.

Thus the present device may be employed for qualitative as well as quantitative analyzed gaseous mixtures. For making quantitative analyses, it is known that viscosities of chemically similar gases are quantities which are additive on a mole fraction basis. Thus, referring to FIGURE 5, any mixture consisting of ethane and ethylene will follow approximately along the line connecting the "ethane" and the "ethylene" points, with its exact position depending upon the mole fraction of ethane or ethylene in the mixture. Accordingly, a pressure drop of about 2" of water would indicate the mixture to be composed of approximately one-third ethane and two-thirds ethylene. For gases which are chemically dissimilar, and for maximum accuracy with similar gases, the best procedure is to employ an experimentally established calibration curve.

It has also been found that sensitivity of the inventive system is dependent on upstream or feed pressure. This relationship is shown in FIGURE 7, and it is seen that sensitivity (pressure drop per unit percent of air in an air-butane mixture) is linear with feed pressure.

From the foregoing description, it is apparent that I have fulfilled the objects of the present invention. By flowing gas through two conduits, one of which has a viscosity-insensitive resistance and the other a viscosity-sensitive resistance, changes in the relative rates of flow may be correlated with viscosity—and hence composition—of the flowing gas. When employing a pneumatic bridge system, bridge imbalance may be taken as a measure of this viscosity. Such imbalance may be detected either by the null balance technique, by measuring pressure differences across the bridge arms, or by measuring flow across an arm-connected conduit. The instant device may be made entirely portable, or may be combined with a process controller to regulate a process variable in response to bridge imbalance.

Although the invention has been described with reference to particular embodiments thereof, it is manifest that these are by way of illustration only. Accordingly, it is contemplated that many variations, modifications and equivalents will be evident in light of my description, and accordingly it is intended to embrace all such variations, modifications and equivalents as fall within the spirit and broad scope of the present invention.

I claim:

A temperature-independent gas viscosimeter apparatus comprising a pneumatic bridge system, an orifice restriction in one outlet arm of said system, a capillary restriction in the other outlet arm, a second capillary restriction in the inlet arm adjacent the outlet arm having an orifice restriction therein, a second orifice restriction in the inlet arm adjacent the outlet arm having a capillary restriction therein, a temperature compensating resistance in one of said outlet arms, a conduit disposed intermediate the arms of said bridge and having a temperature-sensitive electrical resistance element therein for indicating bridge imbalance, and an adjustable resistance in one arm of said bridge system, the adjustment of said adjustable resistance to restore bridge balance being a measure of the viscosity of a gas passing through said system.

References Cited in the file of this patent

UNITED STATES PATENTS

| | | |
|---|---|---|
| 1,100,171 | Brown | June 16, 1914 |
| 1,506,617 | Dommer | Aug. 26, 1924 |
| 2,263,335 | Heinz | Nov. 18, 1941 |
| 2,509,889 | Shockley | May 30, 1950 |
| 2,589,251 | Heinz | Mar. 18, 1952 |
| 2,721,919 | Li | Oct. 25, 1955 |

FOREIGN PATENTS

| | | |
|---|---|---|
| 396,529 | Germany | June 5, 1924 |